United States Patent [19]

Betts

[11] Patent Number: 5,087,106
[45] Date of Patent: Feb. 11, 1992

[54] FURNITURE WITH FASTENING DEVICE

[75] Inventor: David R. Betts, Tenterden, England

[73] Assignee: Kentinental Engineering Limited, Kent, England

[21] Appl. No.: 560,708

[22] Filed: Jul. 31, 1990

[30] Foreign Application Priority Data

Aug. 1, 1989 [GB] United Kingdom ............... 89177540

[51] Int. Cl.⁵ ............................................. A47B 88/00
[52] U.S. Cl. .................................. 312/263; 403/329; 403/388
[58] Field of Search ................ 312/107.5, 257.1, 263; 403/329, 388, 393

[56] References Cited

U.S. PATENT DOCUMENTS

| 3,814,491 | 6/1974 | Kackley | 312/257.1 |
| 4,126,906 | 11/1978 | Foust | 312/263 X |
| 4,415,292 | 11/1983 | Alperson | 403/329 |

FOREIGN PATENT DOCUMENTS

| 0143678 | 5/1985 | European Pat. Off. |
| 796191 | 6/1958 | United Kingdom. |
| 888851 | 2/1962 | United Kingdom. |

Primary Examiner—Joseph Falk
Attorney, Agent, or Firm—Blum Kaplan

[57] ABSTRACT

The invention concerns quick release fastenening means particularly for coupling furniture parts. In a preferred form fastening means (20) for releasably securing together first and second parts (14,15) comprise a first substantially planar member (30) defining a slot (22) having a relatively wide portion and a relatively narrow portion and defining an aperture (23) having an effective centre spaced from the effective centre of the wide portion by a predetermined distance, a second member comprising a stud (25) having a head (32) and a body (31), the head being dimensioned to pass through said wide portion but not through the narrow portion of the aperture (22) and the body being dimensioned to be movable from the wide portion along the narrow portion, and a peg (24) dimensioned to be received in the aperture, the effective centre of the stud being spaced from the effective centre of the peg by said distance, a strip (26) of springy material on which the peg is mounted and effectively connected to the stud, whereby the peg (24) can move away from the plane of the first member. The arrangement is such that when the head (32) is inserted through the wide portion of the slot, the peg (24) is displaced rearwardly by contact with the first member (30) so as to bend the strip, and when the stud is displaced transversely through said distance with the body traversing the narrow portion of the slot (22) the peg will enter the aperture under the bias of the strip to prevent reverse transverse movement until the peg is depressed.

8 Claims, 2 Drawing Sheets

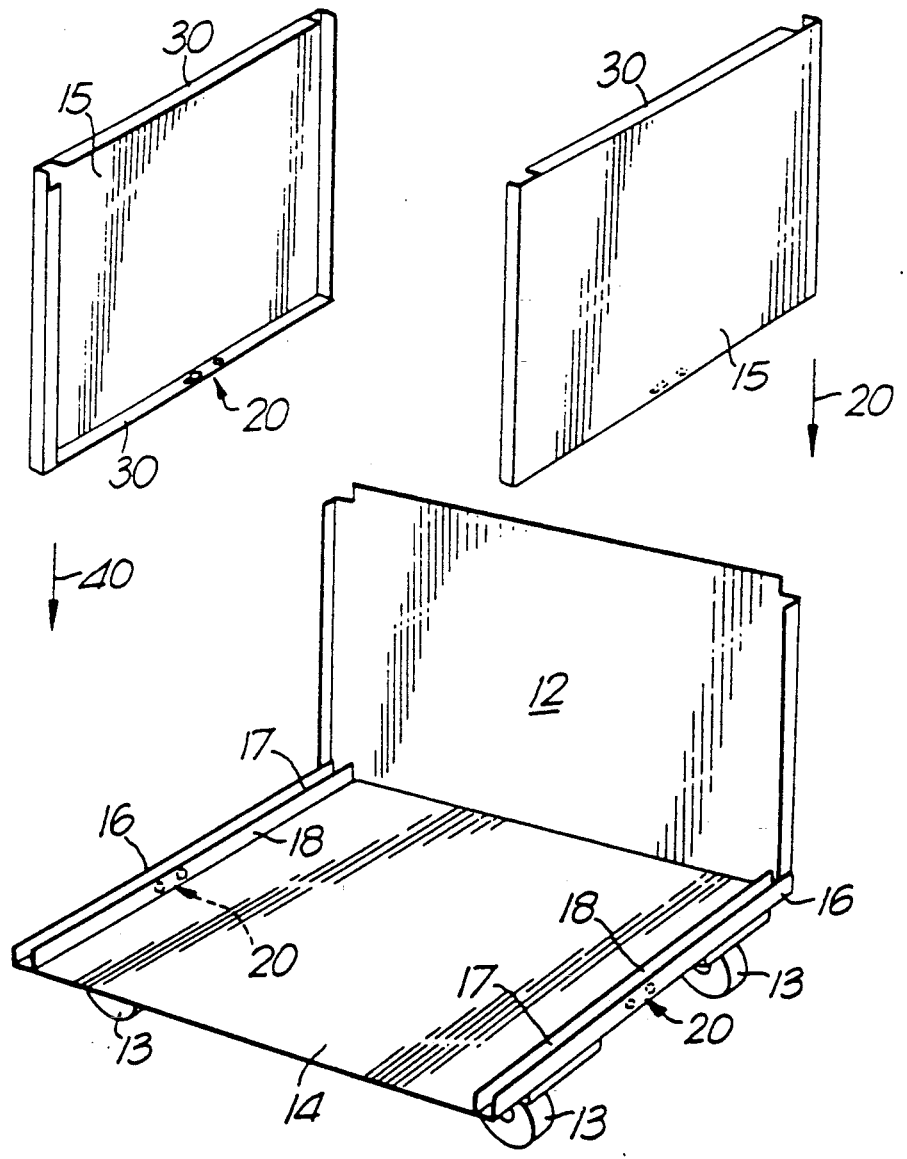

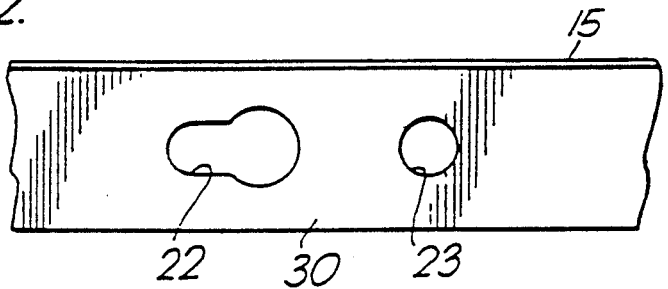
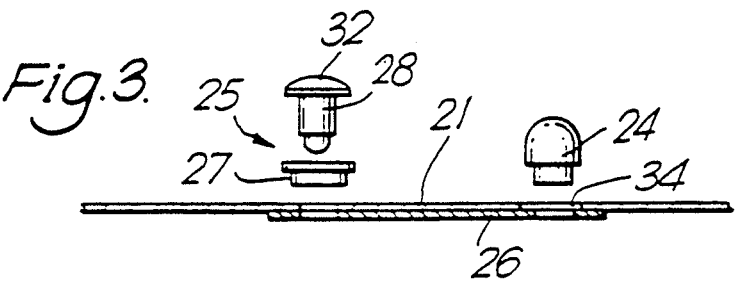
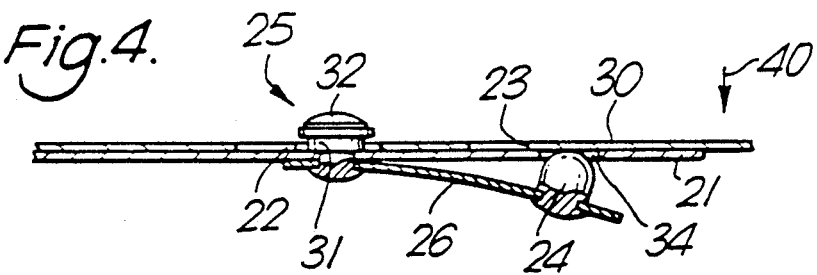
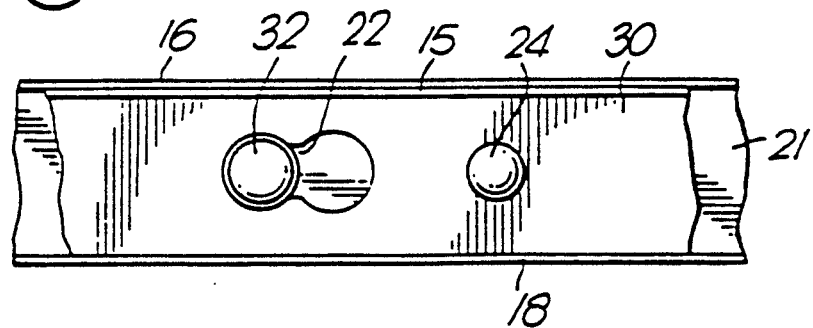

FURNITURE WITH FASTENING DEVICE

BACKGROUND OF THE INVENTION

This invention relates to furniture with a fastening device, particularly for securing together two parts of a knockdown quick assembly piece of furniture, which term includes partitioning or other panel members.

In the Specification of commonly assigned U.S. Pat. No. 4,848,859 there is described a knockdown cabinet having a base, sides and a top which are assembled together simply by pushing the sides into channels formed along the side edges of the base and top. The sides are a close location fit in the channels and no further fastening means are required. For some applications, so that the cabinet can more easily be moved around once assembled, additional fastening means are required to hold the sides to the base and possibly also to the top.

Quick release fastening devices have been devised for innumerable purposes over many years. One such device is disclosed in European Patent Specification 0143678 for locating a seat in a vehicle. In this arrangement a stud locates in a keyhole slot to prevent the seat lifting and a springy strip abuts the stud when so located to resist translational movement. However, using the free end of a springy strip as a stop member is unreliable.

In British Patent 796191 a nut is mounted in an aperture by a combination of a stud fitting in a keyhole slot and a detent retaining it there. This is intended to be a permanent fixture with the nut then acting to receive a screw for securing a panel or other member to the so mounted nut.

British Patent 888851 discloses a stud locating in a keyhole slot with a spring acting on the top of the stud when so located to deter translational movement and retain it there. However, this does not provide a positive stop against such translational movement.

One object of the present invention is to provide a fastening device suitable for securing together panels or other furniture parts and providing a positive but quick release coupling of the parts. Preferably the fastening means are fixed to the furniture parts as they are sold in knockdown form, so that the assembler does not need to use further separate fasteners such as screws or bolts and needs no tools.

SUMMARY OF THE INVENTION

In one aspect, the invention provides knockdown quick assembly furniture parts incorporating fastening means for releasably securing them together, the fastening means comprising a first substantially planar member defining a slot having a relatively wide portion and a relatively narrow portion and defining an aperture having an effective centre spaced from the effective centre of the wide portion by a predetermined distance, a second member comprising a stud having a head and a body, the head being dimensioned to pass through said wide portion but not through the narrow portion of the aperture and the body being dimensioned to be movable from the wide portion along the narrow portion, and a peg dimensioned to be received in the aperture, the effective centre of the stud being spaced from the effective centre of the peg by said distance, a strip of springy material on which the peg is mounted and which effectively connects the peg to the stud, whereby the peg can move away from the plane of the first member, the arrangement being such that when the head is inserted through the wide portion of the slot, the peg is displaced rearwardly by contact with the first member so as to bend the strip, and when the stud is displaced transversely through said distance with the body traversing the narrow portion of the slot the peg will enter the aperture under the bias of the strip so that the engagement of the peg in the aperture prevents reverse transverse movement until the peg is depressed.

Such a fastening means is cheap and simple and can be attached to the parts as sold in knockdown form so it does not require the assembler to use any tools or fix in separate fastenings such as screws or bolts or operate a locking device manually after the parts have been pushed together.

The furniture parts are preferably designed to push fit together, such as those for forming the cabinet described in U.S. Pat. No. 4,848,859 and are preferably made from sheet metal material. The keyhole slot and aperture are preferably formed directly in the sheet metal material and the stud preferably acts as a rivet for securing both the stud and the springy strip to the furniture part.

BRIEF DESCRIPTION OF DRAWINGS

One embodiment of fastening means and furniture parts, in accordance with the invention, will now be described, by way of example only, with reference to the accompanying drawings of which:

FIG. 1 is a perspective view of the base, back and two sides of a cabinet showing how the sides will be connected to the base substantially in accordance with the description of the above mentioned European Application.

FIGS. 2 to 5 show fastening means attached to portions of such sides and base on an enlarged scale. In these figures, FIG. 2 is a plan view of the base edge of a side panel, FIG. 3 is a sectional view of parts of the fastening means before assembly, FIG. 4 is a sectional view of the cabinet parts being assembled and fastened together, and FIG. 5 is a plan view of the cabinet parts and fastening means as fastened together.

DETAILED DESCRIPTION OF ONE EMBODIMENT

The parts of the knockdown cabinet shown in FIG. 1 are made from sheet metal (including alloys) material and include a back 12, a base 14 on wheels 13 and two sides 15. The base 14 has upwardly turned side edges 16 forming the outside walls of upwardly opening channels 17 extending along each side of the base, the inner walls 18 being formed by strips welded to the base. The front edge of the base is flat (or may be turned down) leaving the fronts of the channels open. The sides 15 each have inwardly turned top and bottom edges 30 which are a close location push fit in the channels 17.

Fastening means 20 are provided to co-operate between the bottom edges 30 of the sides and the bases 21 of the channels 17 to fasten the sides securely in the channels in addition to the push fit location. Each fastening means comprises a keyhole slot 22 and a separate spaced aperture 23 formed in the turned over bottom edge 30 of a side and a peg 24 and stud 25 mounted on a strip 26 of springy steel, acting as a leaf spring, fastened to the base 21 of a channel.

The stud 25 comprises a hollow shouldered spacer 27 and a rivet 28, the rivet being inserted through the channel in the spacer and aligned holes in the base 21 and strip 26 and peened over so that the stud and strip are firmly fixed to the base and the stud has an upstanding body 31 with an enlarged head 32. The peg 24 is inserted in a hole in the strip 26 and peened over to secure it. Thus the peg itself acts as a rivet.

To assemble and fasten a side 15 in a channel 17, the base of the side 15 is pushed into the channel from above in the direction of arrow 40 with the front edge of the side just extending outside the front edge of the channel and so that the keyhole portion of the keyhole slot receives the head 32 of the stud 25. The engagement of the base of the turned over edge 30 with the peg 24 depresses this peg against the action of the leaf springs 26 as seen in FIG. 4. The side 15 is then pushed along the channel 17 towards the back 12 with the body 31 of stud 25 sliding along the slot portion of the keyhole slot until the peg 24 engages in the aperture 23. The head 32 then prevents the side being pulled out of the channel and the peg 24 provides a positive, strong location against translational movement until the peg 24 is manually depressed and the side slid forwards until the head is again opposite the keyhole portion of the slot when the side can be pulled out of the channel. The peg 24 must therefore be accessible in the assembled cabinet to allow quick release.

The cabinet will preferably have a top formed along its sides with downwardly opening channels 17 in which the upper edges 30 of the sides 15 are a close location fit and these members may be provided with similar fastening means.

The keyhole slot 22 can be replaced by a tapered slot provided it has a relatively wide portion dimensioned to receive the head of the stud 25 and a relatively narrow portion dimensioned to receive the body of the stud but not the head.

What is claimed is:

1. Knockdown quick assembly furniture parts incorporating fastening means for releasably securing a first furniture part and a second furniture part together, the fastening means comprising a first substantially planar member on one of said furniture parts defining a slot having a relatively wide portion having an effective center and a relatively narrow portion having an effective center, and defining a secondary aperture having an effective center, the effective center of the narrow portion of the slot spaced from the effective center of the wide portion by a predetermined distance, the second of the furniture parts defining a second fastening member including a planar portion and a stud having a head and a body mounted to the planar portion, the head being dimensioned to pass through the wide portion but not through the narrow portion of the slot on the first furniture part and the body being dimensioned for transverse movement from the wide portion to the narrow portion, an opening spaced a predetermined distance from the stud, and a substantially planar strip of resilient material mounted to the planar portion of the second furniture part on the side opposite the first furniture part, a peg dimensioned to be received in the aperture on the first furniture part mounted on the resilient strip and passing through the opening in the second furniture part whereby the peg can move with the stud when displaced parallel to the plane of the strip and away from the plane of the first member by flexing the strip, the arrangement being such that when the head is inserted through the wide portion of the slot, the peg is displaced rearwardly away from the first furniture part by contact with the first furniture part so as to bend the strip, and when the stud is displaced transversely through said distance with the body traversing the narrow portion of the slot the peg will enter the aperture under the bias of the strip so that the engagement of the peg in the aperture prevents reverse transverse movement until the peg is depressed.

2. The knockdown quick assembly furniture parts of claim 1, wherein the first and second furniture parts are made from sheet metal material having a plurality of parts adapted to be assembled by being pushed together, the first and second furniture parts dimensioned such that a portion of one part is a push fit into a portion of a second part, the portions are formed to carry the fastening members.

3. The knockdown quick assembly furniture parts of claim 2, wherein the slot and aperture are formed directly in one of the two furniture parts being assembled.

4. The knockdown quick assembly furniture parts of claim 1, wherein the peg is rivetted to the strip by a rivet.

5. The knockdown quick assembly furniture parts of claim 1, wherein the stud includes a rivet part for rivetting the strip to a furniture part.

6. The knockdown quick assembly furniture parts of claim 1 further including a third part; one furniture part is a base mounted on wheels, the other furniture parts are two sides with a top and bottom edge sides, two pairs of studs and pegs are coupled to the base and project upwardly and a slot and aperture are defined on the bottom edge of each side.

7. The knockdown quick assembly furniture of claim 4 wherein, the peg is formed with a rivet portion for mounting to the strip.

8. A fastening device comprising a first substantially planar member defining a slot having a relatively wide portion having an effective center and a relatively narrow portion having an effective center, and defining a secondary aperture having an effective center, the effective center of the narrow portion of the slot spaced from the effective center of the wide portion by a predetermined distance, a second fastening member including a planar portion and a stud having a head and a body mounted to the planar portion, the head being dimensioned to pass through the wide portion but not through the narrow portion of the slot and the body being dimensioned to be movable for transverse movement from the wide portion to the narrow portion, an opening spaced a predetermined distance from the stud, and, a substantially planar strip of resilient material mounted to the planar portion on the side opposite the first fastening member, a peg dimensioned to be received in the aperture on the first fastening member, mounted on the resilient strip and passing through the opening in the second fastening member, whereby the peg can move with the stud when displaced parallel to the plane of the strip and away from the plane of the first member by flexing the strip, the arrangement being such that when the head is inserted through the wide portion of the slot, the peg is displaced rearwardly away from the first fastening member by contact with the first fastening member so as to bend the strip, and when the stud is displaced transversely through said distance with the body traversing the narrow portion of the slot the peg will enter the aperture under the bias of the strip so the peg in the aperture prevents reverse transverse movement until the peg is depressed.

* * * * *